(12) United States Patent
Bierc

(10) Patent No.: US 7,809,634 B1
(45) Date of Patent: Oct. 5, 2010

(54) ENTERPRISE-WIDE TOTAL COST OF RISK MANAGEMENT USING ARQ

(76) Inventor: Gary J. Bierc, 8328 Capel Dr., Pasadena, MD (US) 21122

( * ) Notice: Subject to any disclaimer, the term of this patent is extended or adjusted under 35 U.S.C. 154(b) by 810 days.

(21) Appl. No.: 11/176,762

(22) Filed: Jul. 7, 2005

Related U.S. Application Data

(60) Provisional application No. 60/586,540, filed on Jul. 9, 2004.

(51) Int. Cl.
G06Q 40/00 (2006.01)

(52) U.S. Cl. .......................... 705/38; 705/35

(58) Field of Classification Search .............. 705/38
See application file for complete search history.

(56) References Cited

U.S. PATENT DOCUMENTS

| | | | |
|---|---|---|---|
| 5,704,045 A | 12/1997 | King et al. | |
| 5,812,988 A | 9/1998 | Sandretto | |
| 5,970,479 A | 10/1999 | Shephard | |
| 6,078,905 A | 6/2000 | Pich-LeWinter | |
| 6,119,093 A | 9/2000 | Walker et al. | |
| 6,134,536 A | 10/2000 | Shephard | |
| 6,193,654 B1 | 2/2001 | Richardson et al. | |
| 6,317,727 B1 | 11/2001 | May | |
| 6,321,212 B1 | 11/2001 | Lange | |
| 6,876,992 B1 | 4/2005 | Sullivan | |
| 7,006,992 B1* | 2/2006 | Packwood | 705/38 |
| 7,319,971 B2* | 1/2008 | Abrahams et al. | 705/7 |
| 2001/0027437 A1* | 10/2001 | Turbeville et al. | 705/38 |
| 2003/0018503 A1* | 1/2003 | Shulman | 705/7 |
| 2003/0149657 A1* | 8/2003 | Reynolds et al. | 705/38 |
| 2004/0044617 A1* | 3/2004 | Lu | 705/38 |
| 2004/0054565 A1* | 3/2004 | Nemecek et al. | 705/7 |
| 2004/0215551 A1* | 10/2004 | Eder | 705/38 |
| 2005/0114829 A1* | 5/2005 | Robin et al. | 717/101 |
| 2005/0197952 A1* | 9/2005 | Shea et al. | 705/38 |
| 2005/0228622 A1* | 10/2005 | Jacobi | 703/2 |

OTHER PUBLICATIONS

I Ben-David, T Raz, An integrated approach for risk response development in project planning, Jan. 2001, The Journal of the Operational Research Society, vol. 52, Issue 1, pp. 1-12.*
Ben-David, T Raz, An integrated approach for risk response development in project planning, Jan. 2001, The Journal of the Operational Research Society, vol. 52, Issue 1, pp. 1-12.*
Overview of Enterprise Risk Management, Casualty Actuarial Society, May 2003, 64 total pages.*
Enterprise Risk Management, KPMG, Nov. 2001, 31 total pages.*

* cited by examiner

*Primary Examiner*—Alexander Kalinowski
*Assistant Examiner*—Gregory Johnson
(74) *Attorney, Agent, or Firm*—Drinker Biddle & Reath LLP

(57) ABSTRACT

The invention relates to the business disciplines known as Enterprise Risk Management, or ERM and with the addition of this invention, Strategic Risk Management, or SRM. It specifically relates to the quantification or measurement and validation of the historical impact of all risks and risk management activity on an organization. The invention provides a methodology to measure, baseline, track and benchmark the total cost of all historical risk events, including both positive and negative events, and risk-related activities that impact the earnings of an organization.

17 Claims, 4 Drawing Sheets

ENTERPRISE-WIDE TOTAL COST OF RISK MANAGEMENT USING ARQ

CROSS-REFERENCE TO RELATED PATENT APPLICATIONS

This patent application claims benefit under 35 U.S.C. §119(e) from U.S. Provisional Patent Application No. 60/586,540, filed Jul. 9, 2004, the entire content of which is herein incorporated by reference.

FIELD OF THE INVENTION

The present invention relates to measuring and managing risk for organizations. More specifically, the invention relates to the measurement of risk for all historical risk events and all risk-related or risk response activities using a novel methodology.

BACKGROUND OF THE INVENTION

Risk management has become increasingly important in today's business climate and at the same time, more difficult to assess. With the enactment of the Sarbanes-Oxley Act of 2002, more stringent reporting and record-keeping demands have been placed on already over-burdened organizations. The field of enterprise (or enterprise-wide) risk management (ERM) is evolving to fill organizations' needs. Currently, three different industries and professions have provided the models that are in general use: energy and financial services; auditing; and insurance.

In the energy and financial services industries, organizations sought to manage risk because of volatility in the financial and commodities markets and the need to have a more consistent means to calculate revenue and profits. The term enterprise risk management was most likely used first in these industries. Initially this sector used high-level statistical science and mathematics to help solve the volatility risks they face in the markets. The energy and financial services industries soon realized that similar techniques could be applied to manage credit risk as well. These predictive models provided the invaluable analytical means necessary to assess the most effective hedging methods needed to manage these specific risks.

From a historical perspective, the energy and financial services industries developed a bottom-up approach to ERM called Operations Risk Management that attempts to identify and document every negative risk event (or loss) in the organization and also identify, document and quantify the cost of every control (or risk management activity) in the organization through the aggregation of historical losses and operations risk costs. This assessment methodology results in capturing costs associated with operations risks, but does not measure any other types of risk or those risks that could be associated with volatile markets.

The auditing profession also developed methods of ERM to manage the risks not controlled by analysis of pure financial data. Traditional sampling methods, in most cases, did not dig deep enough to get results and auditors found that they did not always find all the relevant information and could miss events like fraud in a corporation. To resolve this problem, auditors utilized a control-based audit method with risk as the best determinate of control sampling to assess the internal controls of the organization. The auditors could then assess what modifications to controls must be put into place to ensure the effective management of the risks. This method is referred to as business risk management, as well as ERM.

While the auditing profession has developed a version of ERM to assess and manage the risks associated with the practices and procedures used in an organization, this ERM process still does not include real dollars risk quantification or a means to measure ERM effectiveness.

The third to develop ERM was the insurance industry. For those who buy and sell insurance, risks can be difficult to assess. Insurance company actuaries learned that by applying actuarial modeling to the whole, rather than peril-by-peril, total expected losses were lowered, resulting in the emergence of integrated insurance policies. The insurance industry found that bundling low or negatively correlated risks would lower the overall cost of risk because the risks offset one another to some degree. This approach, while managing the risks associated with hazards or perils, does not provide information for risks that cannot be insured by traditional mechanisms.

ERM has been generally defined as a process that focuses on identifying, measuring and responding to anything that could affect the achievement of objectives. It puts risk and the assessment of risk at the heart of decision-making for an organization. While it can improve audit effectiveness or internal controls, it also serves as a methodology to structure and improve the overall efficiency and effectiveness of an organization or a particular process within an organization. Since the enactment of the Sarbanes-Oxley Act of 2002, ERM has become even more important as a business process because it can be used to assess the effectiveness of internal controls.

The next step to making organizations effective in the optimal sense is Strategic Risk Management (SRM). SRM is a measurable, multi-dimensional process that is integrated through all of an organization's planning, budgeting and decision making processes. It uses the fundamental approach of ERM of identifying, measuring and responding to risk and creates value through its effective and practical application as a fully integrated process of the organization. In Effect, SRM applies ERM tools and methods strategically thereby enabling an organization to generate measurable value from its adoption.

Three distinct risk management options exist for measuring and quantifying historical risks and risk-related activity in a business setting.

First, the Total Cost of Risk (TCOR) model addresses a narrow spectrum of risk events, including those risks that are insured or hedged. The TCOR method provides a means of organizing and measuring the impact of risks based on information available for those that are well-defined, including perils, hazards, liabilities and other risk events. The TCOR model organizes risk information into three categories: administrative activities, premiums/spreads, and risk retention. This method is commonly used to assist professional insurance buyers in assessing their personal risk management performance and the effectiveness of their insurance programs.

The TCOR method, however, has several disadvantages. This method is limited to a well-defined, measured set of insurable or hedge-able risks. The TCOR method fails to address the effect of positive risk opportunities and fails to measure the impact of lost positive risk opportunities. It also makes no connection between risk and performance or the ability to achieve objectives. Finally, this method does not provide a means to measure SRM/ERM performance.

A second method of measuring risk involves the aggregation of historical losses and operations risk costs and is commonly called Operations (or Operational) Risk Management or Operations (or Operational) Risk Quantification. This bottom-up approach, commonly used in the financial services and energy industries, attempts to identify and document all negative risk events or losses in an organization. This method identifies, documents and quantifies the cost of every control, or risk management activity, as well as attempting to quantify all of the risks that fall into the broad category of operations risk.

Because it uses a detailed bottom-up methodology, the Operations Risk Management approach is quite labor-intensive and costly. It also can not guarantee that it includes all risks in its measurements. For example, it does not address the effect of positive risk opportunities and, like the TCOR method, does not measure the impact of lost positive risks. Further, this method is limited to those risks that are defined as operations type risks and does not correlate the measurement of risk with performance or an ability to achieve objectives. This type of measurement does not provide a methodology to measure and manage continuous improvement. Finally, this method does not provide a means to measure SRM/ERM performance.

A third method of measuring risk is at risk technology. This method can have many different names, depending on the variable for which risk is being measured. This method calculates the value of aggregate risk events by measuring volatility, or the change in risk over time. This method can be applied in the calculation of the maximum expected loss, or value at risk, of specific assets or any other regularly measured corporate value. The at risk value used in this method is equivalent to one standard deviation of historical actual events over a more than 24 month period or equivalent data points of time.

This third method presents several problems in practical application. First, it fails to incorporate the cost of managing risk. Second, it makes no connection between risk and performance or ability to achieve objectives. Third, it fails to determine the effectiveness or optimization of SRM/ERM activity. This method is also difficult to benchmark and does not fully incorporate the commonly accepted ERM definition of risk.

Therefore, there is a need for a method of assessing and managing risk that can manage risk while making a connection to performance and ability to achieve objectives. This method should also measure all types of risk, including positive risk activities or opportunities, provide a means to measure SRM/ERM performance, incorporate the accepted ERM definition of risk, and optimize the ability to benchmark goals.

BRIEF SUMMARY OF THE INVENTION

The present invention is a method for calculating and measuring risks using a concise means to calculate the aggregate impact of risk and capture material risk events in all areas of an organization and analyze them in the context of financial goals and performance volatility. The Aggregate Risk Quantification (ARQ) including the Enterprise (or -Enterprise-wide) Total Cost of Risk (ETCOR) and the ARQ Index method of calculating risk, as disclosed here, provides the methodology to evaluate the effectiveness of an organization's risk response activity by determining the cost-benefit over time of specific risk areas. The invention also provides an accurate aggregate and objective view of the total risk footprint or overall view of the risks facing an organization. The invention uses this risk footprint to determine the areas in which an organization may improve and helps pinpoint the changes necessary to achieve these improvements. The invention can also calculate the ARQ Index by normalizing ETCOR as a percentage of revenue to accurately benchmark risk management effectiveness against peer organizations. This invention can also be used to determine the effectiveness of internal controls, a critical issue raised by the Sarbanes-Oxley Act of 2002.

An embodiment of this invention calculates ETCOR to measure risk by calculating the cost of enterprise-wide risk response plus the net cost of enterprise-wide risk retention. Other embodiments of this invention calculate ARQ and its components for individual business units of an organization. An embodiment of this invention uses aggregate financial reporting information to calculate ETCOR. Another embodiment of this invention uses information from individual reporting units to calculate ETCOR for each unit before integrating the individual units to arrive at an overall ETCOR value. An additional embodiment of this invention calculates ETCOR as a percentage of revenue, providing a normalized measure of ERM performance, referred to as the ARQ Index. Further, ARQ can be combined with at risk methods to provide another embodiment: ARQ at Risk. Finally, since ARQ objectively calculates the full historical impact of risk for any given financial reporting period, it can be applied effectively to determine an organization's true return on risk. The various embodiments of this invention and the possible permutations thereof can be used to assess and understand risk at different levels and for different purposes in an organization.

DETAILED DESCRIPTION OF THE INVENTION

By incorporating the achievement of objectives into the final calculation for a strategic risk management assessment, the ARQ method views organizations differently, separating functions along risk lines rather than traditional lines.

Figure 1:
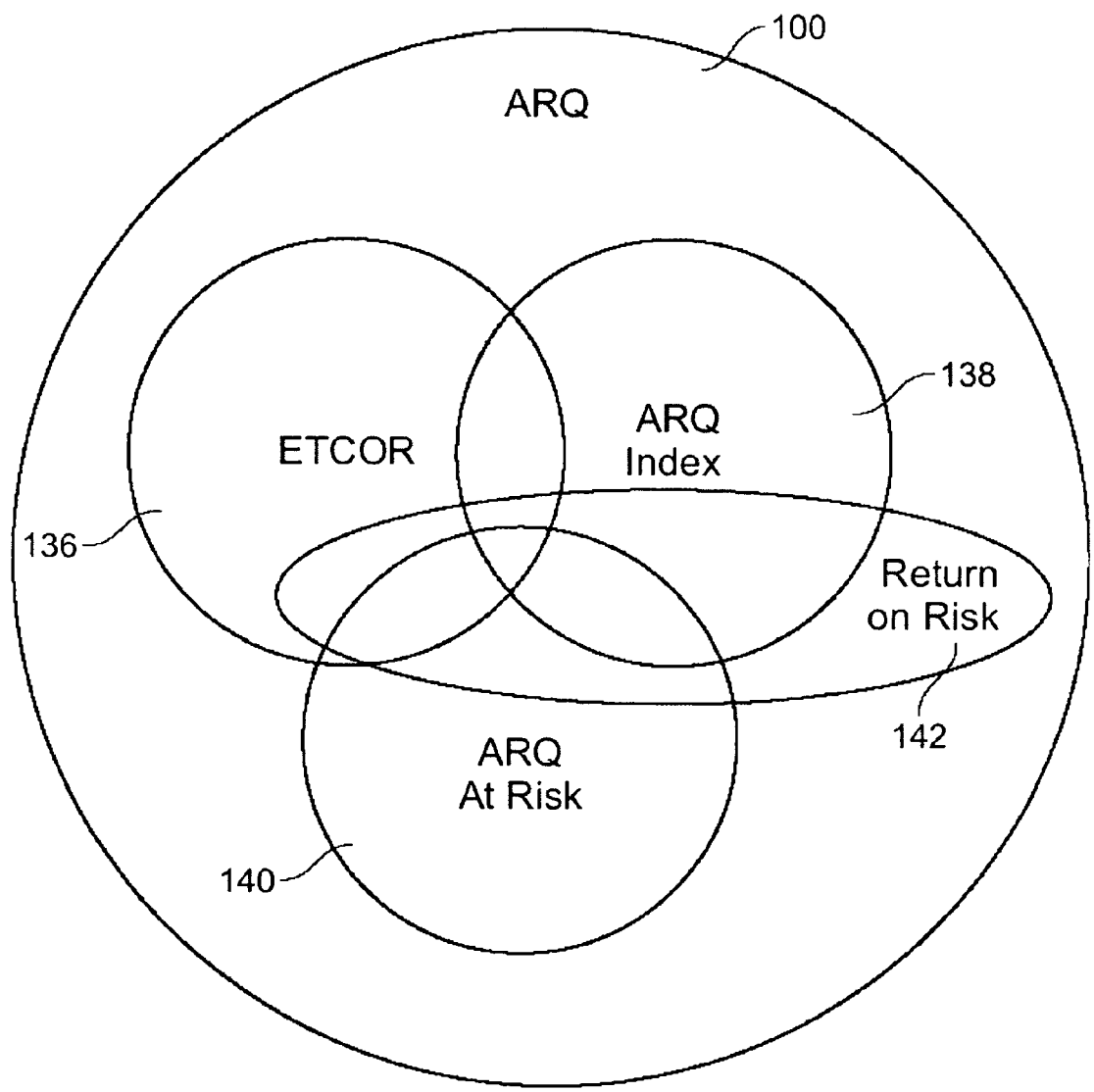
FIG. 1 is a Venn diagram illustrating the relationship between ARQ and its components.

FIG. 1 is a Venn diagram that illustrates the relationship between ARQ 100 and the metrics that comprise ARQ 100. ARQ 100 is the overarching principle used to calculate, assess and manage the historical impact of risk on an organization. ARQ 100 provides the currently missing component needed to adopt a measurable and value-based ERM/SRM process (see FIG. 2). ETCOR 136, the ARQ Index 138, ARQ at Risk 140, and Return on Risk 142 all comprise metrics that can be used alone, together or in combination with other methods to assess risk as a part of ARQ 100. ETCOR 136 is described more fully in FIG. 3 and the accompanying description herein. The ARQ Index 138 is calculated as the normalized value of ETCOR 136 as a percentage of revenue. ARQ at Risk 140 is an assessment of ARQ 100 in terms of the change in ARQ 100 over time. Return on Risk 142, also known as Risk Coverage ratio, divides ETCOR into an organization's earnings (NI, OP, EBIT, EBITA, etc.) to determine the level of risk coverage for a given period.

The metrics of ARQ 100 can each stand alone as a tool for risk management. Depending on the desired risk assessment and management for an organization, however, the metrics of ARQ 100 may be more powerful when combined. For example, ETCOR 136 on its own may be used to manage risk in an organization, but in combination with the ARQ Index 138, it can be used to predict the effects of these risks on revenue. ARQ 100 can also encompass other methods and calculations, such as Economic Value Added, that in the aggregate can be used to assess and manage risk in a continuous process, monitoring the ever-changing risk footprint of an organization.

The ARQ 100 invention attacks the SRM/ERM risk aggregation problem from a completely different perspective than the current methods and processes. ARQ 100 breaks from conventional thinking and redefines the equation for aggregating risk by incorporating objectives achievement into the final calculation. It also views an organization differently, separating functions along risk lines rather than traditional lines. The result is an objective measure of the total historical impact of risk on an organization, which captures all direct risk impacts (both opportunities and threats), and the cost of actively managing risk. Other risk management methods fail to include the risk impacts of the positive risks that affect an organization. Traditional risk management measures only the negative risks for an organization. These negative risks include risks like the potential for failure of a business unit, the possibility of late deliveries of products, the likelihood that an agricultural crop will have a low yield, and other such risks that represent the potential for harm to an organization. On the other hand, positive risks may include risks like new operational efficiencies which drive cost savings, the opening of a new branch office, launching a new product, providing services in a new area and other risks that represent positive opportunities for an organization. ARQ 100 takes both these positive and negative risks into account for a total picture of risk management for an organization.

ARQ 100 fulfills a need in the risk management and assessment field to quickly and accurately capture all risks, whereas previously available methods of risk management cannot capture all of the enterprise risks impacting an organization. ARQ 100 also provides the methodology to measure in dollar terms the performance of an organization's enterprise risk activity. ARQ 100 measures ERM performance over time in a normalized fashion that empowers organizations to hold the appropriate managers accountable for risk-related issues. ARQ 100 also provides the first definite dollar measure of effective internal controls as defined under Section 302 of the Sarbanes-Oxley Act of 2002. By using ARQ 100, shareholders can translate enterprise risk management effectiveness into earnings per share (EPS) impact.

Figure 2:
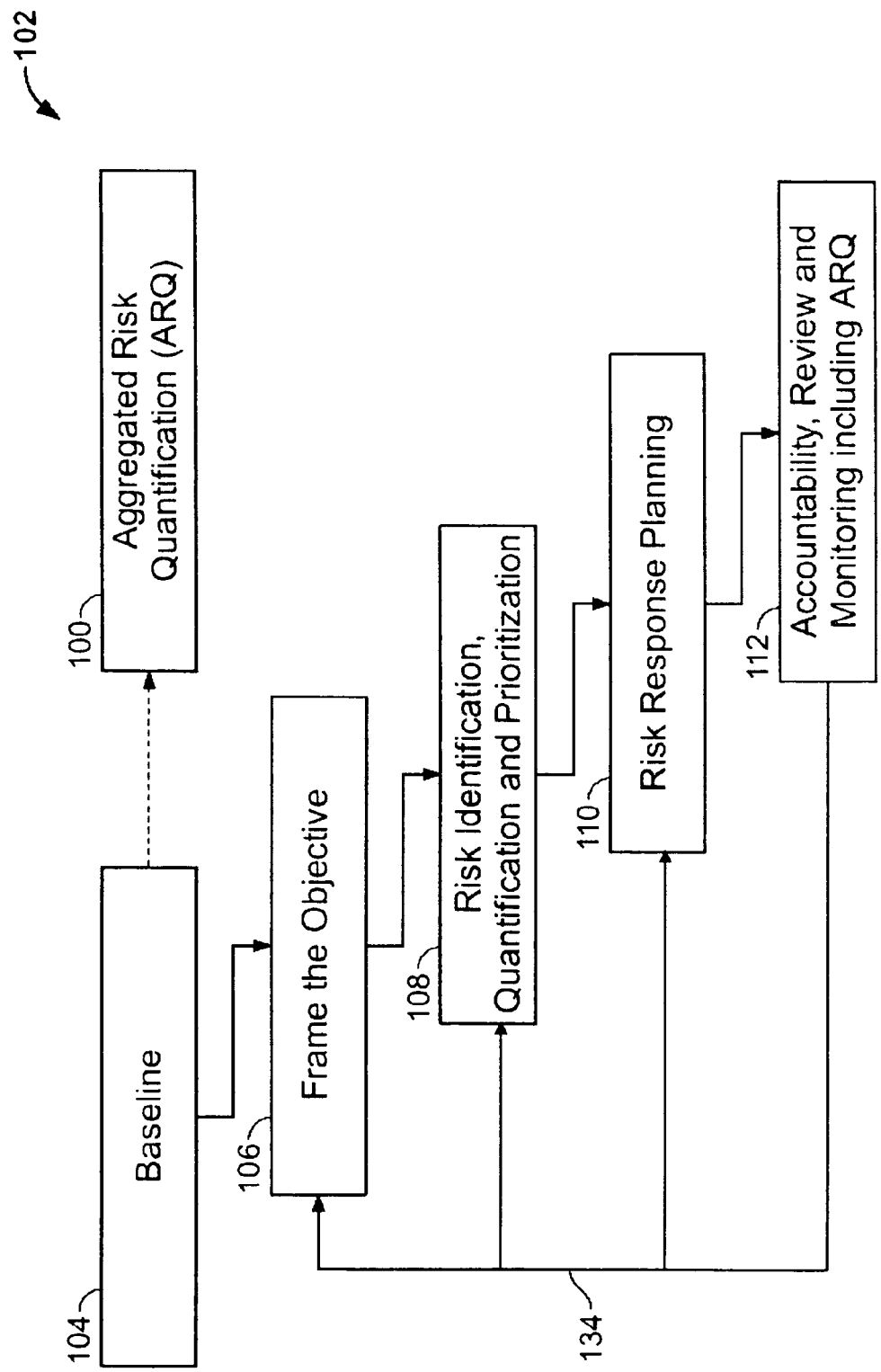
FIG. 2 is a flow chart showing where ARQ fits into a strategic risk management process.

FIG. 2 is a flow chart illustrating where ARQ 100 falls within a risk management system 102. While the steps included in the risk management system 102 are not all new in the art, the use of ARQ 100 to establish the baseline 104 is new. Other methods may be used to establish a baseline 104, but this invention discloses the use of ARQ 100 as a means of objectively determining the baseline 104 in hard dollar terms and based on objectives. Further, the concept of a risk management system using ARQ 100 in a closed system as indicated by the arrow 134 is new and allows the risk management system to continually reevaluate the risks posed to an organization. The first step in developing a full assessment and risk management plan for an organization comprises establishing the baseline 104 of risk. In this invention, the baseline 104 of risk is determined by calculating ARQ 100 for an organization. The baseline 104 can be calculated using past information from the organization for all areas, including financial, insurance, operational performance and any other relevant information. Having this knowledge from the past can help an organization by allowing it to leverage that knowledge going forward to understand what risks are most important to the running of the organization.

Once the proper baseline 104 is determined as ARQ 100, the next step in risk assessment and management is to frame the objective 106, or context of risk. At this step, the objective is stated in a way that is specific, measurable, achievable, results-oriented, and with a defined timeframe. At the frame the objective 106 stage in the analysis, the data obtained at the baseline 104 stage is used to better shape or enhance the objectives set. An example of the frame the objective 106 stage could include an objective to increase manufacturing productivity by at least ten percent over the next year. The next step in the process is risk identification, quantification and prioritization 108. This stage requires an investigation into the potential negative and positive risks or opportunities, which will affect the achievement of the objectives stated at the frame the objective 106 stage.

The process of risk identification, quantification and prioritization 108 includes three fundamental steps: (1) identification of the negative risks, opportunities, causes, redundancies, and correlations in the context of the objective; (2) based on the measurable objectives, quantifying the negative risks and opportunities in dollar terms through the use of minimums, maximums and expected value; and (3) prioritizing them based on expected financial impact on the objectives using statistical analysis in order to identify those risks that may require more strategic attention. Risk identification, quantification and prioritization 108 could, for example, be used with an objective to market a particular product in a new region of the country with a sales goal of $X within one year by: (1) identifying all of the threats and opportunities that will affect a successful introduction of the product and the achievement of the sales goal, (2) quantifying the potential impact of each of the threats and opportunities in dollars on reaching the sales goal within one year using minimum, maximum and expected value for each risk, offsetting risks wherever possible; and (3) prioritizing which risks must be addressed first based on their potential effect on reaching the sales goal within one year. Objectives can be addressed at any level in the organization using this process.

The next stage in the process, risk response planning 110, involves formulating plans to respond to the risks that have been identified as key through prioritization. The risk response planning 110 stage can be dealt with by an organization as a whole or at the business unit or functional level within the organization. A particular business unit may have responsibility for certain objectives identified at the organization's frame the objective 106 stage and other objectives are the responsibility of a different business unit or a functional area. Each response strategy becomes an objective for the next level of the organization and therefore, generates its own set of risks, which then must be identified, quantified and prioritized with responses developed to those risks. The process produces a cascade of risks and responses down through all levels while creating alignment from the top to the bottom of the organization.

The final stage in the process involves accountability, review and monitoring 112 to ensure that objectives identified at the frame the objective stage in the process are being met when all the stages in the process are put into practice. If the accountability, review and monitoring 112 stage reveals unexpected outcomes, a review of the process can be used to determine where adjustments may be made to more accurately arrive at the intended objectives. As indicated by the arrow 134, this risk management system creates a complete loop through an organization, providing continuous feedback. After the accountability, review and monitoring 112 stage, an organization can return to the frame the objective 106 stage and reassess its organizational objectives. This looped system allows an organization to develop its risk management activity along with the dynamic changes of the organization or as the outside pressures that affect an organization change over time. Through this system and repeating the cycles of the system to adjust for changes, ARQ 100 becomes part of how an organization functions.

Figure 3:
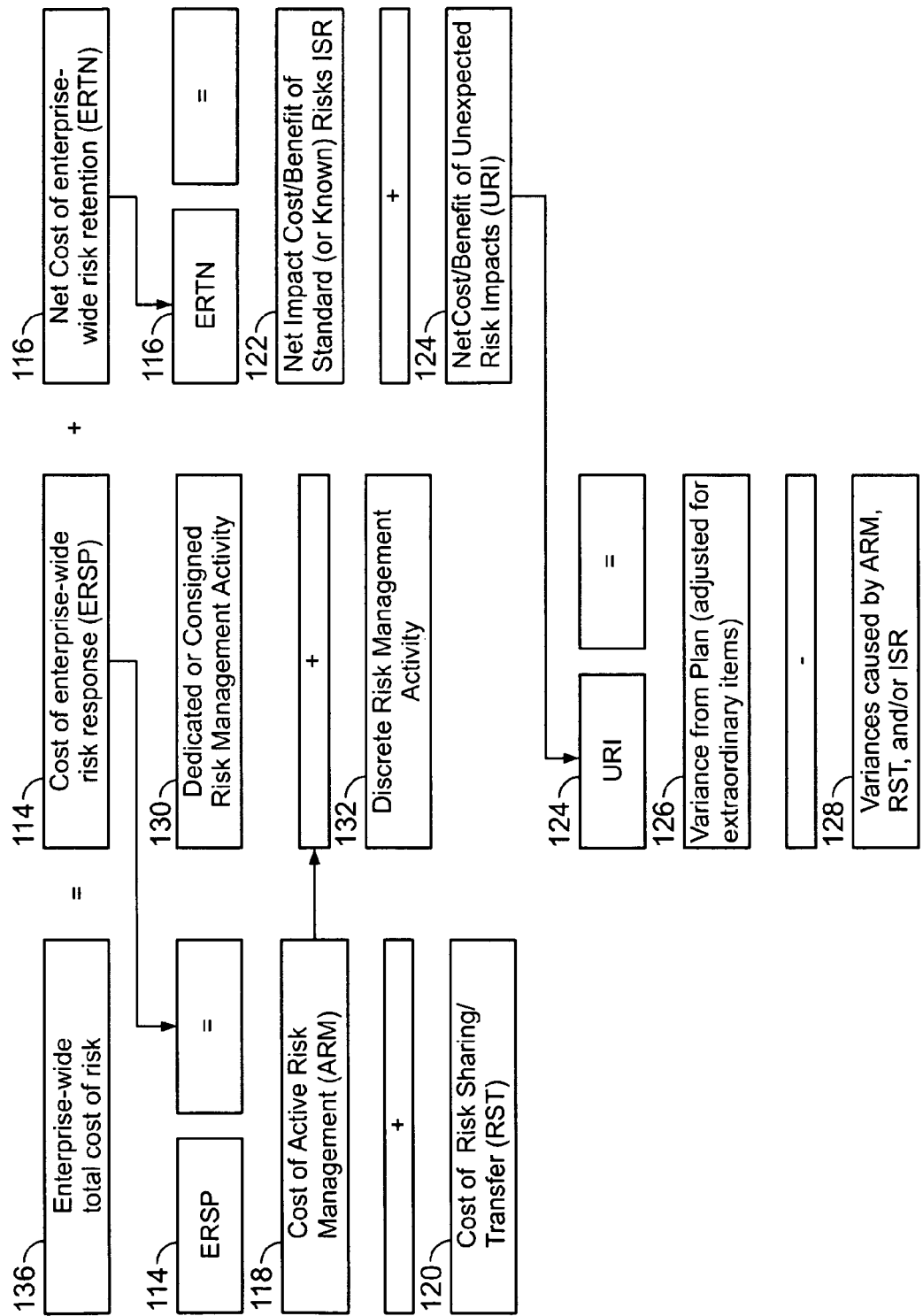
FIG. 3 is a diagram of the equation that comprises ETCOR.

FIG. 3 is a diagram illustrating the equation used in arriving at ETCOR 136 as the baseline 104 and monitoring 112 metric for strategic risk management in FIG. 2. ETCOR 136 is the sum of the cost of enterprise-wide risk response (ERSP) 114 and the net cost of enterprise-wide risk retention (ERTN) 116. This equation, however, is built upon more complex equations where ERSP 114 is the sum of the cost of active risk management (ARM) 118 plus the cost of risk financing/sharing/transfer (RST) 120. In turn, ERTN 116 is the sum of the net impact cost/benefit of standard (or known) risks (ISR) 122 plus the net cost/benefit of unexpected and unspecified risk impacts (URI) 124. URI 124 is the result of subtracting variances caused by ARM, RST and/or ISR 128 from the variance of a financial variable from plan, as adjusted for extraordinary items 126.

In calculating ERSP 114, ARM 118 represents the cost of various risk management activities undertaken by an organization in any given period. These costs include the total cost of carrying dedicated or consigned enterprise risk management functions and the costs associated with discrete day-to-day risk-related activities in operations.

To derive the ARM 118 element of ERSP 114, an organization must first be dissected into two parts. This dissection reveals the difference between risk producing functions and risk handling functions in the organization. This dissection is critical to the identification of dedicated, or consigned, enterprise risk management functions. The risk producing functions are the critical or essential functions needed in the organization to produce, sell, and deliver product/services to the customer, as well as the functions required to record these transactions, handle cash and oversee the organization's overall progress, as by executive decision-makers. The focus of these functions is highly operational or transactional.

Technically, all functions other than risk producing functions in an organization exist to manage the risks created by risk producing functions, and are thus referred to as risk handling functions, or Dedicated or Consigned Risk Management Activity 130 functions. The Dedicated or Consigned Risk Management Activity 130 functions are identified as all those functions leftover after the risk producing functions have been identified. Discrete risk management line item spending and activity conducted exclusively by risk producing functions are referred to here as Discrete Risk Management Activity 132. Essentially, the ARM 118 element of ERSP separates the active risk management cost of risk handling or Dedicated or Consigned Risk Management Activity 130 functions from the Discrete Risk Management Activity 132, which are embedded as line item spending in the risk producing functions.

RST 120 represents the cost to finance, transfer risk, hedge risk, or share risk with a third party. Typically, RST 120 includes items such as interest expense, dividends, insurance premiums, spreads from hedging or derivatives, or the opportunity cost of greater margin lost by sharing or transferring risk to business partners, suppliers, or contractors.

ISR 122 represents risk events that are common and part of day-to-day business operations. For this reason, ISR 122 risk events are usually tracked as either a line item in the general ledger accounting system or off-line by one of the risk handler functions. ISR 122 costs include items such as insurance claims, gains and losses from trading activity, errors and allowances in manufacturing, and bad debt expense.

URI 124 represents the remaining risk events, which have effected the organization during the period of assessment. URI 124 is calculated by subtracting any variances caused by ARM, RST and/or ISR 128 from the variance from plan (adjusted for extraordinary items) 126. URI 124 thus measures variance from a perspective of the organization as a whole by ensuring that the measurement of variance adjusts the variance from plan 126 in accordance with the variance caused by ARM, RST and/or ISR 128. URI 124 captures the variance in net earnings or other financial measures, such as EVA, of the company remaining after adjustments for extraordinary items and reversing variances caused by the ERSP items and ISR 122 items. In effect, URI 124 is the key variable required to accurately capture an organization's aggregate cost of risk and serves as the most important element in determining ETCOR 136 and ARQ 100.

In order to derive URI 124, ARQ 100 incorporates a widely accepted ERM-based definition of risk directly into the ARQ 100 equation. The definition of risk applied by ARQ 100 is, anything that impacts the achievement of objectives. ARQ 100 accomplishes a determination of risk by combining the actual cost of risk and risk management activity with the variance to actual earnings performance. ARQ uses financial budgets, plans or goals as the quantifiable representation of an objective. Therefore the total net impact of risk events across the enterprise, in any given period, is accurately, represented directly by the difference between actual performance and the goal (or variance). Thus, variance includes the total portfolio of risk events, which have affected an enterprise, both the pluses and minuses. ARQ 100 recognizes this figure as a true cost of risk value that it builds into the equation as URI 124. This inclusion of URI 124 into ARQ 100 is important because the variance amount captures the impact of both opportunities and threats, as well as the cost of lost opportunities. This figure also completes the calculation so that all risk-related costs are definitively captured in the formula in the context of any earnings objective, creating an accurate value, which can be reported every period. ARQ 100 also directly links risk to objectives because of the way that it incorporates variance 126 into the equation of risk management. This enables an organization to build plans and budgets that incorporate risk and risk activity, and provides a new perspective and methodology for managing an organization.

Figure 4:
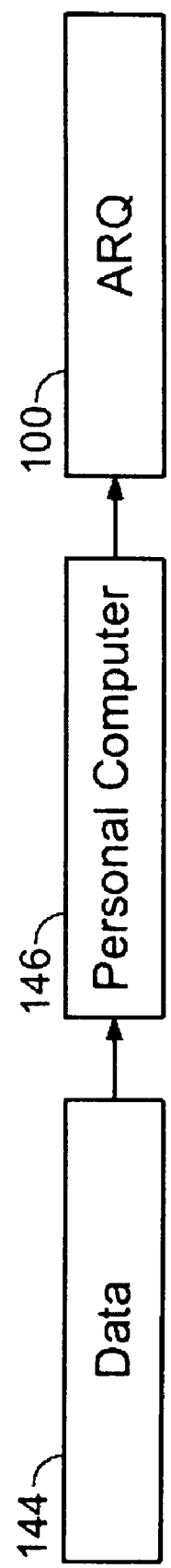
FIG. 4 is a diagram illustrating the involvement of a personal computer and computer software in calculating ARQ.

FIG. 4 is a diagram illustrating the involvement of a personal computer and computer software in calculating ARQ. The information used to derive the ARQ 100 calculation can be collected and analyzed by two different methods. One method involves the manual entry of data 144 constituting financial information including budgets and actual financial results into spreadsheet software on a personal computer 146. The personal computer 146 is an ordinary personal computer having a central processing unit, operating system, hard drive memory and software capabilities. A second method uses business intelligence software to automatically draw the data 144, including relevant budget data, actual financial data and information from the appropriate information systems as stored in the memory of the personal computer 146. This business intelligence software uses adapters to extract data for use in calculating ARQ 100. Either of these methods can be used to calculate ETCOR 136, the ARQ Index 138, and/or any other ARQ 100 embodiment.

Application of this invention to enterprise-wide risk management creates a strategic risk management effect and can be accomplished in any of several ways. One option for implementing this invention into enterprise-wide risk management involves the extraction of key items used to determine ARQ 100 from an organization's financial reporting or audit reports at a consolidated or aggregate level. A second option for implementing this invention involves separating ARQ 100 into reporting units before consolidating the units for an aggregate view, and by reporting detailed risk events discovered in each of the reporting units through a forensic audit in the URI 124 section of the metric. A third option constitutes calculating ARQ 100 as a percentage of revenue, providing the user with a normalized measure of enterprise risk management performance (ARQ Index).

Although only a few exemplary embodiments of the present invention have been described in detail above, those skilled in the art will readily appreciate that many modifications are possible in the exemplary embodiments without materially departing from the novel teachings and advantages of this invention. For example, the order and functionality of the steps shown in the processes may be modified in some respects without departing from the spirit of the present invention. Accordingly, all such modifications are intended to be included within the scope of this invention.

What is claimed is:

1. A method for managing and assessing risk to an organization, the method comprising the steps of:
    providing a storage medium for storing data and programs used in processing data;
    providing a central processing unit for processing data, wherein the central processing unit performs the determining steps;
    dissecting the organization into two parts, the two parts comprising risk producing functions and risk handling functions;
    determining a cost of the risk handling functions;
    determining an aggregate risk quantification, the aggregate risk quantification comprising an enterprise-wide total cost of risk value that comprises the cost of the risk handling functions and a first value that is the result of subtracting variances from a business plan caused by a cost of Active Risk Management (ARM), a cost of Risk Sharing/Transfer (RST), and Impact of Standard Risks (ISR) from a variance of a financial variable from the business plan, as adjusted for extraordinary items;
    establishing a baseline value for risk to the organization based on the determined aggregate risk quantification;
    defining a measurable goal, wherein data used to determine the aggregate risk quantification is used to define the goal;
    determining after a defined timeframe whether the organization accomplished the goal;
    if the goal was not accomplished, reviewing the process to determine where adjustments could be made to more accurately arrive at the goal; and
    repeating the steps of setting a goal and determining whether the organization accomplished the goal.

2. The method of claim 1, further comprising:
    identifying negative risks, opportunities, causes, redundancies and correlations in the context of the goal;
    quantifying the negative risks and opportunities in dollar terms;
    using statistical analysis to identify key risks, which may require more attention than other risks; and
    prioritizing the risks based on a risk's expected financial impact on reaching the goal.

3. The method of claim 1, wherein the goal is a one-year sales goal for a new product and the method further comprises:
    identifying all of the threats and opportunities that will affect a successful introduction of the product and achievement of the sales goal;
    quantifying for each threat and opportunity a potential impact of the threat or opportunity on reaching the sales goal; and
    prioritizing which risks must be addressed first based on their potential effect on reaching the sales goal within one year.

4. The method of claim 2, wherein the risks are quantified in dollar terms using minimum, maximum, and expected values.

5. The method of claim 2, further comprising formulating plans to respond to the identified key risks.

6. The method of claim 1, wherein the enterprise-wide total cost of risk value further comprises a value selected from the group consisting of: a risk financing value, a risk sharing value, and a risk transfer value.

7. The method of claim 6, wherein the enterprise-wide total cost of risk value further comprises a cost of standard risks value.

8. The method of claim 1, wherein the determined aggregate risk quantification is based upon an enterprise-wide total cost of risk value and at least one value selected from the group consisting of: an aggregate risk quantification index value, a return on risk value, and an aggregate risk quantification at risk value.

9. An apparatus for managing and assessing risk in an organization, the apparatus comprising:
    a storage medium for storing data and programs used in processing the data;
    a central processing unit for processing data, wherein the central processing unit performs the steps of:
    detecting input data;
    calculating a cost of risk handling functions for the organization, the cost of the risk handling functions based on a dissection of the organization into two parts, the two parts comprising risk producing functions and risk handling functions;
    calculating an aggregate risk quantification, wherein the calculated aggregate risk quantification comprises an enterprise-wide total cost of risk value that comprises the cost of the risk handling functions and a first value that is the result of subtracting variances from a business plan caused by a cost of Active Risk Management (ARM), a cost of Risk Sharing/Transfer (RST), and Impact of Standard Risks (ISR) from a variance of a financial variable from the business plan, as adjusted for extraordinary items;
    establishing a baseline value for risk to the organization based on the determined aggregate risk quantification;
    defining a measurable goal, wherein data used to determine the aggregate risk quantification is used to define the goal;
    determining after a defined timeframe whether the organization accomplished the goal;
    if the goal was not accomplished, reviewing the process to determine where adjustments could be made to more accurately arrive at the goal; and
    repeating the steps of setting a goal and determining whether the organization accomplished the goal.

10. The apparatus of claim 9, wherein a user manually enters the input data into spreadsheet software.

11. The apparatus of claim 9, wherein one of the programs is business intelligence software that automatically draws the input data from the data stored on the storage medium.

12. The apparatus of claim 9, wherein the enterprise-wide total cost of risk value further comprises a value selected from the group consisting of: a risk financing value, a risk sharing value, and a risk transfer value.

13. The apparatus of claim 12, wherein the enterprise-wide total cost of risk value further comprises a cost of standard risks value.

14. A method of managing and assessing risk to an enterprise, the method comprising the steps of:
   (a) providing a storage medium for storing data and programs used in processing the data and providing a central processing unit for processing data, wherein the central processing unit performs steps (c) and (h);
   (b) dissecting the organization into two parts, the two parts comprising risk producing functions and risk handling functions and determining a cost of the risk handling functions;
   (c) calculating an aggregated risk quantification a total cost of risk value for the enterprise based on input data, the aggregate risk quantification comprising an enterprise-wide total cost of risk value that comprises the cost of the risk handling functions and a first value that is the result of subtracting variances from a business plan caused by a cost of Active Risk Management (ARM), a cost of Risk Sharing/Transfer (RST), and Impact of Standard Risks (ISR) from a variance of a financial variable from the business plan, as adjusted for extraordinary items;
   (d) establishing a baseline of risk to the enterprise based upon the determined risk value;
   (e) defining a measurable goal using the input data;
   (f) identifying a plurality of risks, a plurality of opportunities, a plurality of causes, a plurality of redundancies and a plurality of correlations in the context of the goal;
   (g) quantifying the plurality of risks, and the plurality of opportunities in dollar terms;
   (h) using statistical analysis to identify key risks of the plurality of risks, wherein the key risks require more attention than other risks of the plurality;
   (i) prioritizing the plurality of risks based on a risk's expected financial impact on reaching the goal;
   (j) formulating a plurality of plans to respond to the identified key risks;
   (k) examining outcomes of a process to determine whether any unexpected outcomes exist;
   (l) if unexpected outcomes exist, reviewing the process to determine where adjustments could be made to more accurately arrive at the goal; and
   (m) repeating steps (e), (f), (g), (h), (i), (j), (k) and (l).

15. The method of claim 1, further comprising determining a cost of line item risk management spending in the risk producing functions, wherein the enterprise-wide cost total cost of risk value further comprises the cost of line item risk management spending in the risk producing functions and the cost of RST.

16. The apparatus of claim 9, wherein the central processing unit further performs the step of determining a cost of line item risk management spending in the risk producing functions, wherein the enterprise-wide cost total cost of risk value further comprises the cost of line item risk management spending in the risk producing functions and the cost of RST.

17. The method of claim 14, in which step (b) further comprises determining a cost of line item risk management spending in the risk producing functions, and wherein the enterprise-wide cost total cost of risk value in step (c) further comprises the cost of line item risk management spending in the risk producing functions and the cost of RST.

* * * * *